(12) United States Patent
Bessette et al.

(10) Patent No.: US 8,419,041 B2
(45) Date of Patent: Apr. 16, 2013

(54) HITCH

(75) Inventors: Robert Bessette, Drummondville (CA); Robert Handfield, Drummondville (CA)

(73) Assignee: Kimpex Inc., Drummondville (CA)

( * ) Notice: Subject to any disclaimer, the term of this patent is extended or adjusted under 35 U.S.C. 154(b) by 71 days.

(21) Appl. No.: 13/043,041

(22) Filed: Mar. 8, 2011

(65) Prior Publication Data
US 2012/0228852 A1  Sep. 13, 2012

(51) Int. Cl.
*B60D 1/155* (2006.01)

(52) U.S. Cl.
USPC .......................................... 280/507; 280/506

(58) Field of Classification Search .................. 280/506, 280/507
See application file for complete search history.

(56) References Cited

U.S. PATENT DOCUMENTS

| | | | | |
|---|---|---|---|---|
| 5,333,888 A | * | 8/1994 | Ball | 280/504 |
| 5,423,566 A | * | 6/1995 | Warrington et al. | 280/415.1 |
| 6,835,021 B1 | * | 12/2004 | McMillan | 403/374.4 |
| 7,093,845 B1 | * | 8/2006 | Fast | 280/489 |
| 7,448,640 B2 | * | 11/2008 | Weaver | 280/507 |
| 2010/0201102 A1 | * | 8/2010 | Weaver | 280/506 |
| 2010/0283225 A1 | * | 11/2010 | Lahn | 280/506 |

* cited by examiner

*Primary Examiner* — Kevin Hurley
*Assistant Examiner* — Michael Stabley
(74) *Attorney, Agent, or Firm* — Brouillette & Partners; François Cartier; Robert Brouillette

(57) ABSTRACT

A hitch, which can be rigidly yet removably attached to a vehicle-mounted sleeve, comprises a longitudinally extending member which is configured to slide into the sleeve and which locks therewith with a transverse locking device in a conventional manner. The member is divided into two sections along a plane which is inclined with respect to the longitudinal axis of the member. The sections are connected together by a bolt threading into one section while being operable from the outside of the other section. Due to the inclined plane separating both sections, tightening of the bolt causes the sections to slide in opposite directions within the sleeve until they abut and press on opposite inner walls of the sleeve, thereby eliminating play between the member and sleeve. The hitch is conceived such to prevent a user to drive without the locking device in place.

19 Claims, 10 Drawing Sheets

HITCH

CROSS-REFERENCE TO RELATED APPLICATIONS

There are no cross-related applications.

FIELD OF THE INVENTION

The present invention generally relates to hitches and hitch assemblies and more particularly to anti-rattling and/or anti-wobbling hitches and hitch assemblies.

BACKGROUND OF THE INVENTION

Hitches have long been used to provide a mechanism for connecting a trailer to a towing vehicle. Such hitches, especially when used to connect a trailer to a motor vehicle, are typically detachable from the towing vehicle.

Hitches are made detachable from the towing vehicle to solve the following dilemma. It is useful for a hitch to extend beyond the rear of the towing vehicle to facilitate attachment of the trailer to the hitch, and to allow the trailer to pivot freely relative to the towing vehicle.

A hitch is commonly attached to the towing vehicle by means of a rigid square or rectangular sleeve which is fixedly mounted at the rear of the vehicle. The corresponding square or rectangular member of the hitch, which is slightly smaller than the sleeve, is inserted into the sleeve. A locking device, such as a pin, a bolt or any other suitable element, is then inserted transversally through matching holes in the side walls of the sleeve and the member, and is then locked with a locking device, typically via a cotter pin, to prevent the locking device from slipping out of the holes.

Some space is usually left between the inner walls of the sleeve and the outer walls of the member to allow easy attachment and detachment of the hitch. For the same reason, space is usually left between the locking device and the holes in the walls of the member and sleeve. These spaces are large enough to allow for ease of coupling and decoupling of the hitch despite imperfections in the machining of the hitch and sleeve and despite rust and other surface accumulations (e.g. ice, mud, dirt, dust, etc.).

The problem with these spaces is that they allow play in the connection between the hitch and the sleeve that can be noisy, more particularly when carrying an empty trailer. The play between the outer walls of the hitch and the inner walls sleeve can cause clanging noises and vibrations that can be felt within the towing vehicle. That play may also be magnified by the lever arm of the hitch so that it is felt more strongly by the trailer. The play between the locking device and the holes in the walls of the member and sleeve can be felt mainly in the acceleration and deceleration of the trailer relative to the towing vehicle.

Prior art discloses systems wherein the outer walls of the member of the hitch are pressed against the inner walls of the sleeve. This configuration decrease the level of vibration and noise but it presents an inconvenient. Some users can forget to install the locking device to lock the hitch in the sleeve. The installation of the locking device may be forgotten since the member is press fitted in the sleeve of the vehicle and may seem to be secured. Consequently, when the vehicle is in use, there is a high risk that the hitch will come out from the sleeve, principally because of the vibration of the vehicle.

For the aforementioned reasons, there is clearly a need for an improved hitch wherein the shortcomings of prior art hitches are at least mitigated.

SUMMARY OF THE INVENTION

The present invention is providing a hitch for use in cooperation with a vehicle-mounted sleeve, the sleeve comprising a longitudinal opening and a pair of aligned mounting holes configured to receive the locking device, the hitch comprising a member adapted to slide into the sleeve, the member comprising a first section comprising a first extremity and a second extremity, the second extremity having a first plane inclined relatively to a longitudinal axis of the member, the first section comprising mounting holes; a second section comprising a first extremity and a second extremity, wherein the first extremity of the second section comprises a second plane inclined relatively to the longitudinal axis of the member, the second inclined plane configured for engagement with the first inclined plane, the second section comprising a threaded portion; a bracket extending from the second section, the bracket further comprising an opening and a nut; a bolt extending in the member, one end of the bolt being threaded, the threaded end being configured to be received by the threaded portion of the second section, wherein the threaded end of the bolt is configured to abut against the locking device such that when the bolt is screwed, the bolt pulls the second section toward the first section to slide against each other along their inclined planes, and wherein a length of the threaded end bolt being such that the second section cannot be pulled toward the first section if the locking device is not inserted into the mounting holes.

In a further embodiment, the present invention is providing a hitch for use in cooperation with a vehicle-mounted sleeve and a locking device, said sleeve comprising a longitudinal opening and a pair of aligned mounting holes configured to receive said locking device, said hitch comprising a longitudinally extending member having a first section having transversal mounting holes and a second section, said first section and said second section having opposing end surfaces inclined relative to the longitudinal direction of said member, and said second section comprising a threaded portion; a bolt extending in said member and operatively connectable to said second section with said threaded portion, said bolt being connectable to said second section for urging said inclined surfaces against each other thereby to cause displacement of said sections transversely to said bolt and make frictional retentive engagement of said hitch assembly with said sleeve, said bolt having a threaded end configured for abutment against said locking device; wherein said second portion cannot be pulled toward said first portion if said locking device is not inserted in said mounting holes of said sleeve and of said first section.

The present invention is also providing a method to install a hitch on a vehicle-mounted sleeve comprising transversal mounting holes, said hitch comprising a member having a first section having transversal mounting holes and a second section, a bolt extending in said member and operatively connected to said second section with a threaded portion, said first section and said second section having opposing end surfaces inclined relative to a longitudinal direction of said member, said bolt being connected to said second section for urging said inclined surfaces against each other thereby to cause displacement of said sections substantially transversely to said longitudinal direction of said member and make frictional retentive engagement of said hitch assembly with said sleeve, said method comprising the steps of inserting said member into said sleeve; inserting said locking device into said mounting holes of said sleeve and of said first section; screwing said bolt such that said threaded end of said bolt abuts against said locking device; screwing said bolt such that said bolt pulls said second section toward said first section along the two inclined surfaces; wherein said second portion can not be pulled toward said first portion if said locking device is not inserted in said mounting holes of said sleeve and of said first section.

The aforesaid and other shortcomings of prior art hitches are generally mitigated by the present hitch which member comprises sections configured to slide in opposite directions, when actuated by a bolt, such as to press against opposite inner walls of the sleeve, thereby eliminating play between the member and the sleeve and preventing unwanted movements of the member with respect to the sleeve. Furthermore, the present invention discloses a security mechanism preventing the hitch to be mounted to the sleeve if the locking device is not mounted first.

Hence, the present hitch generally comprises a longitudinally extending member which is configured to be slidingly received into a receiving sleeve secured to a vehicle. The member is provided with mounting holes in its side walls which are configured to receive a conventional locking device.

The member is provided, at one of its extremities, with an attachment portion for receiving hitch-mounted accessories such as, but not limited to, a trailer ball or a bicycle rack. The attachment portion is welded or otherwise fixedly, yet possibly removably, secured to the member.

In accordance with one aspect of the present invention, the member is divided into two complementary sections or parts along a plane which is inclined with respect to the longitudinal axis of the member. Each of the first and second sections therefore comprises a bevelled or wedged extremity which is substantially complementary with the bevelled or wedged extremity of the other section.

The two sections of the member are coupled together via a longitudinally extending bolt which extends through the first section of the member and is threaded into the second section via a nut or some other functionally equivalent fastener. The bolt is operable from outside the member, and/or the attachment portion, and the sleeve.

In use, as the bolt is tightened and is further threaded into the second section, this second section is pulled toward the first section. This pulling motion causes the second section to slide in a first direction (e.g. upwardly) and the first section to slide in a second opposite direction (e.g. downwardly) due to the inclined plane between the two sections. Understandably, the two sections will move in opposite directions until they abut and press upon opposing inner walls of the sleeve, firmly wedging the member within the sleeve. Otherwise said, the second section slides on the first section along their respective inclined plane.

Still, in accordance with another aspect of the present invention, the bolt and the second section of the member are particularly configured such that the second section cannot be pulled toward the first section unless the locking device is installed.

This particular feature adds another layer of security to the hitch as it prevents the hitch to be properly mounted unless the locking device is in place.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel hitch will be described hereinafter. Although the invention is described in terms of specific illustrative embodiments, it is to be understood that the embodiments described herein are by way of example only and that the scope of the invention is not intended to be limited thereby.

Figure 4:
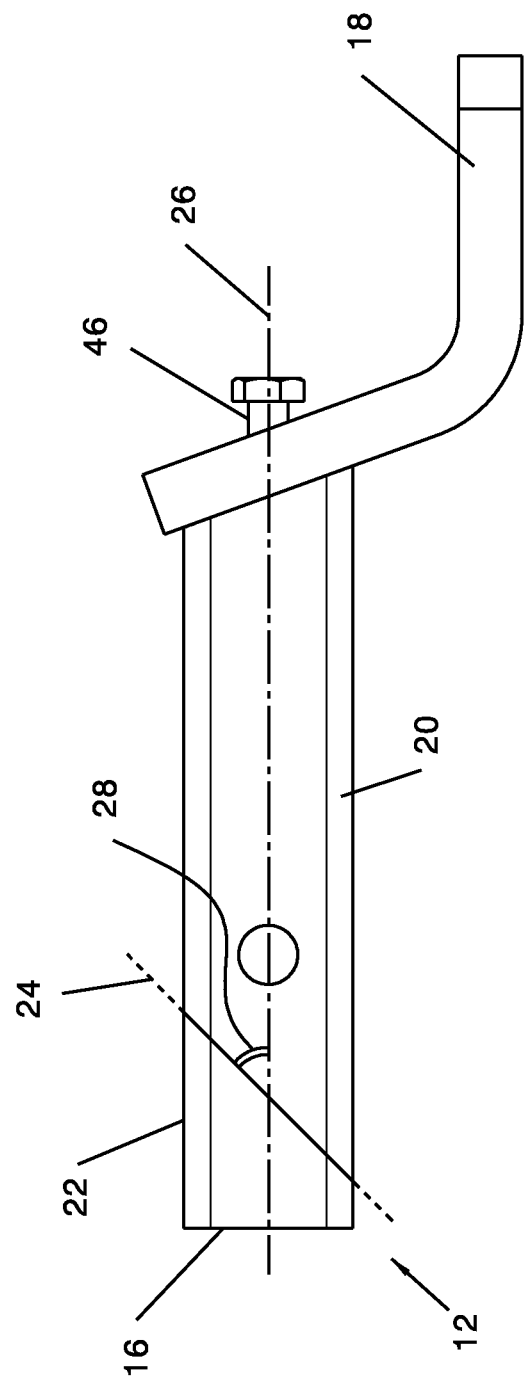
FIG. 4 is a side view of the hitch of FIG. 1.
Figure 5:
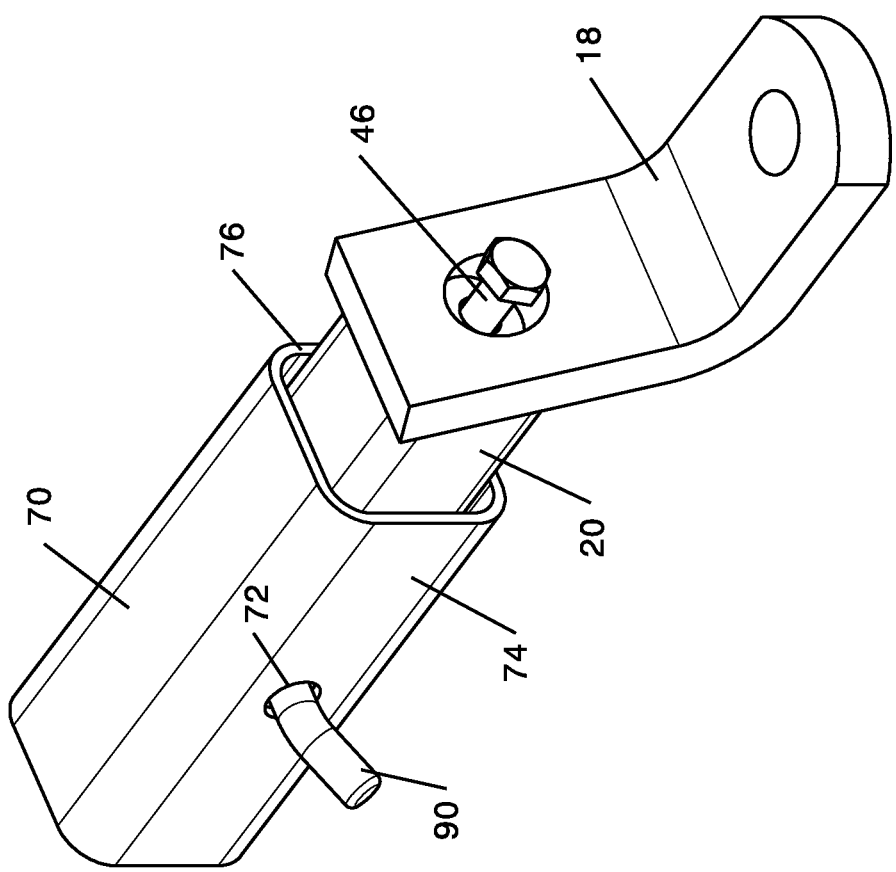
FIG. 5 is a perspective view of the hitch of FIG. 1 as mounted to a sleeve.
Figure 6:
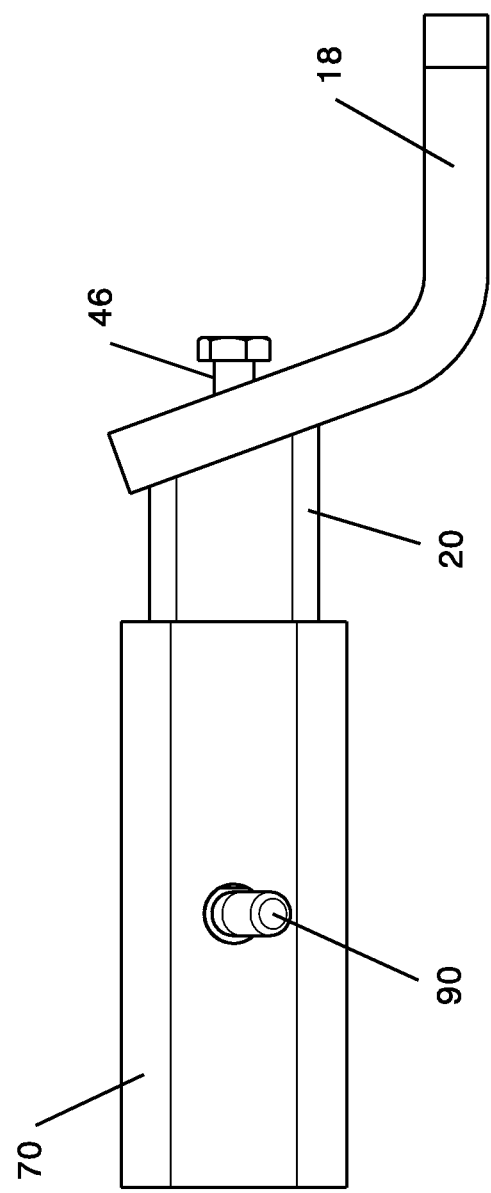
FIG. 6 is a side view of the hitch of FIG. 1 as mounted to the sleeve of FIG. 5.

Referring first to FIGS. 1 to 7, an embodiment of a hitch in accordance with the principles of the present invention is illustrated. The hitch 10 generally comprises a member 12 (as best shown in FIG. 4), comprising a first section 20 and a second section 22, having, at one of its extremities 14 and 16, an attachment portion 18 for receiving a conventional trailer ball (not shown). Understandably, the present hitch 10 could be used for other vehicle-mounted accessories such as bicycles racks or platforms; the present invention is understandably not limited to trailer hitches.

The member 12 of the hitch 10 generally comprises a longitudinally extending tube which is configured to be received into a typical sleeve 70 fixedly mounted to a vehicle (not shown) in a known manner. The cross-section of the member 12 is preferably complementary to the cross-section of the sleeve 70 such that the member 12 can be easily inserted into the sleeve 70. However, the outer dimensions of the member 12 are preferably slightly smaller than the inner dimensions of the sleeve 70 such that the member 12 can be easily inserted into the sleeve 70.

As typical sleeves 70 have a substantially square cross-section, in the present embodiment, the member 12 also has a square cross-section. Other cross-sections are however possible.

Figure 1:
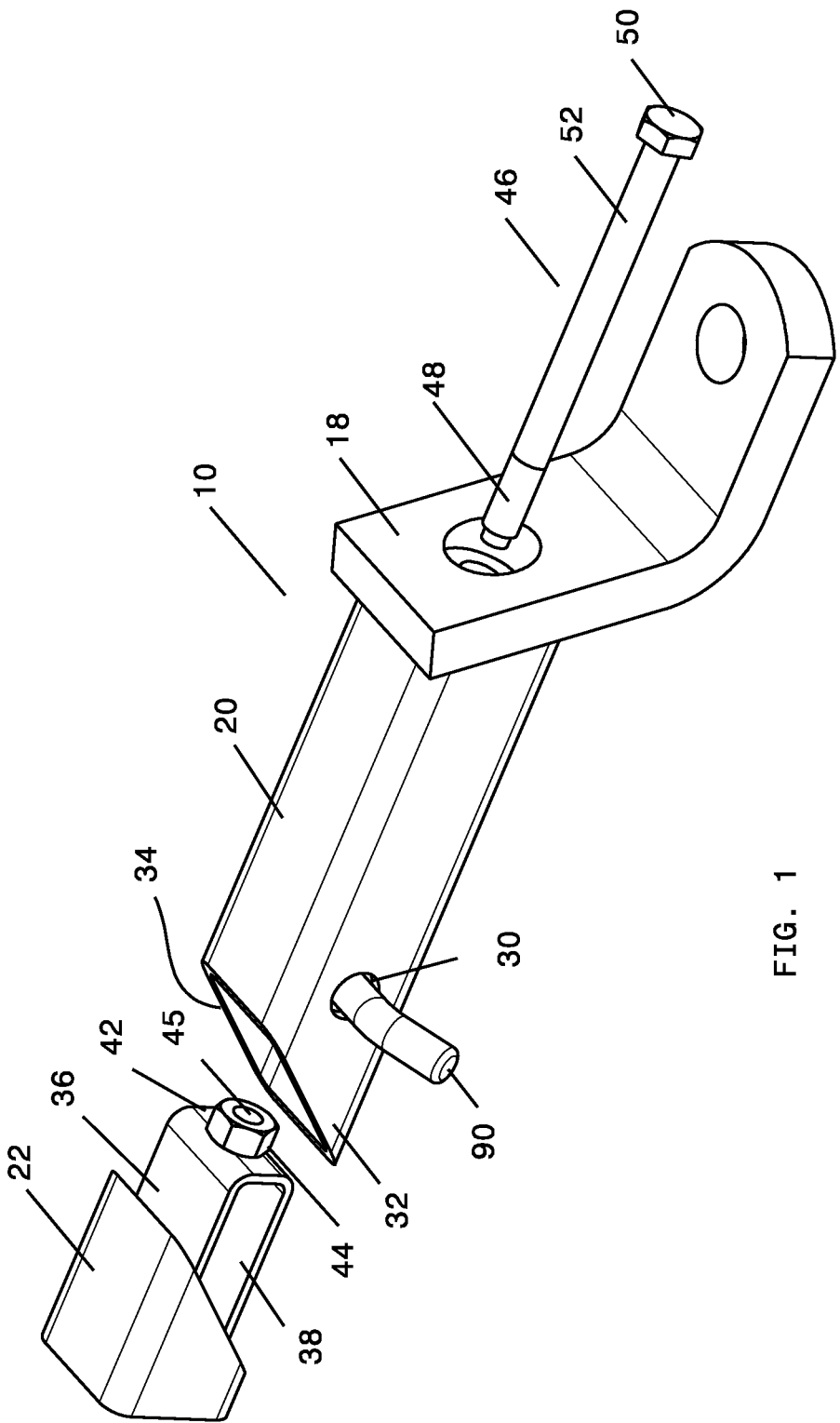
FIG. 1 is a perspective exploded view of an embodiment of the hitch incorporating the principles of the present invention.

As best illustrated in FIGS. 1 and 4, the member 12 is separated into two sections 20 and 22 along a plane 24 which is inclined with respect to the longitudinal axis 26 of the member 12.

In the present embodiment, the angle 28 formed between the plane 24 and the axis 26 is about 45°. Other angles are however possible.

Referring now to FIGS. 1 to 4, the first section 20 of the member 12 is provided with substantially aligned mounting holes 30 formed in the side walls 32 and 34. The mounting holes 30 are configured to receive a conventional locking device 90.

Understandably, as best shown in FIGS. 5 to 7C, the sleeve 70 is also provided with substantially aligned mounting holes 72 formed in the side walls 74 and 76 of the sleeve 70. In that sense, the skilled addressee will understand that the mounting holes 30 of the first section 20 are configured to be substantially aligned with the mounting holes 72 of the sleeve 70 when the member 12 of the hitch 10 is properly inserted into the sleeve 70. In addition, as the skilled addressee will understand, the locking device 90 will transversally extend through both pairs of mounting holes to secure the member 12 to the sleeve 70.

As illustrated in the figures, the second section 22 is typically, though not necessarily, shorter than the first section 20 of the member 12. The second section 22 comprises a bracket 36 having a substantially rectangular side opening 38 extending therethrough.

The bracket 36 extends longitudinally partially inside the second section 22 and partially outside such that the outer portion 42 of the bracket 36 can slide inside the free extremity of the first section. Notably, when the outer portion 42 of the bracket 36 is received into the first section 20, the side opening 38 of the bracket 36 is more or less aligned with the mounting holes 30 of the first section 20 such that when the locking device 90 is inserted through the mounting holes 30, the locking device 90 also extends through the side opening 38 of the bracket 36. Understandably, the bracket 36 and its side opening 38 must be suitably sized to accommodate the locking device 90.

In the present embodiment, the bracket 36, or the inner portion 40 thereof, is preferably welded, or otherwise fixedly secured, to the second section 22.

Figure 2:
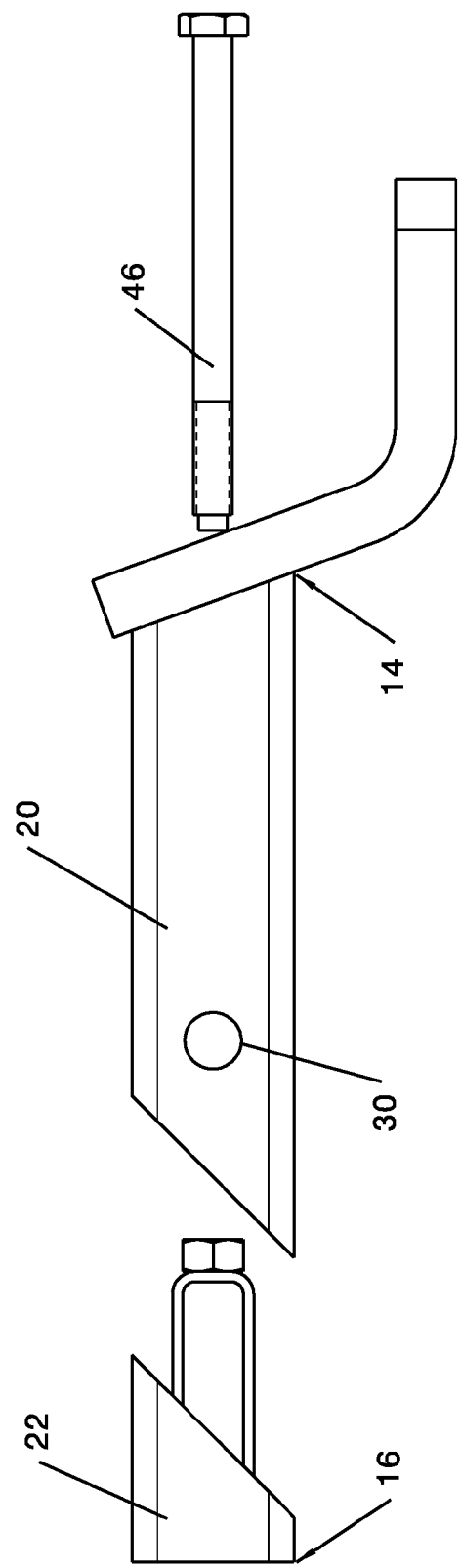
FIG. 2 is a side exploded view of the hitch of FIG. 1.
Figure 3:
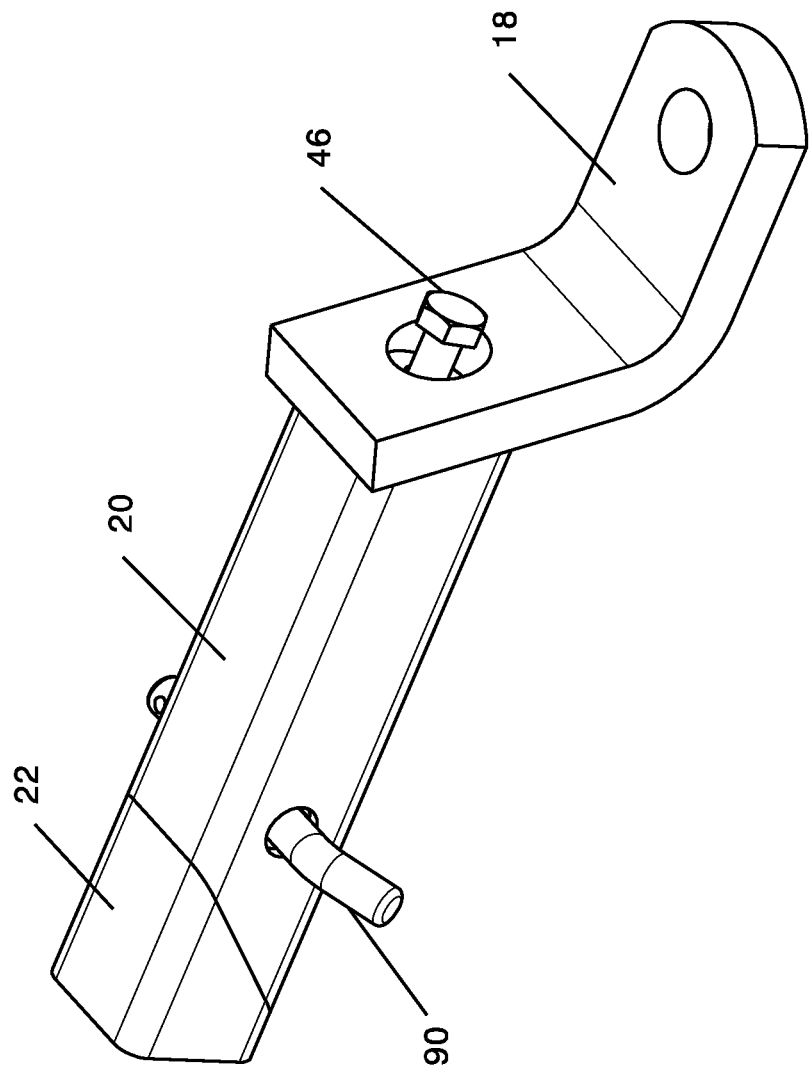
FIG. 3 is a perspective view of the hitch of FIG. 1.

As shown in FIGS. 1 and 2, the bracket 36 comprises, at the extremity of the outer portion 42, a nut 44 or a functionally equivalent threaded fastener. The nut 44, which is preferably welded to the extremity of the outer portion 42, is configured to receive the threaded end 48 of the bolt 46 which will be described below.

The extremity of the outer portion 42 is provided with an aperture which is coextensive with the opening 45 in the nut 44. This aperture allows the threaded end 48 of the bolt 46 to extend within the bracket 36.

The bolt 46 typically comprises a threaded end 48, a tool-actionable head 50 (e.g. a hexagonal head), and an unthreaded shank or central portion 52.

The bolt 46 is particularly configured such that, as it will be better understood below, the second section 22 cannot be pulled toward the first section 20 unless the locking device 90 is installed.

Figure 8:
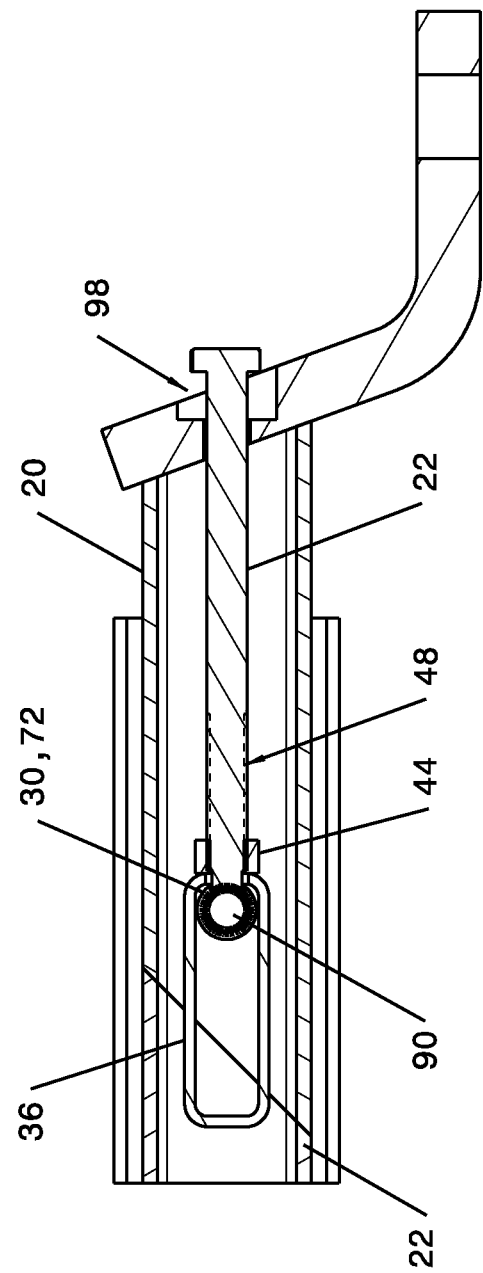
FIG. 8 is a cross section view of the hitch shown in FIG. 7A.

In that sense, the length of the bolt 46 and/or the length of the threaded end 48 are particularly chosen such that if the bolt 46 is fully inserted into the member 12, i.e. the head 50 abutting on the attachment portion 18, the threaded portion 48 will not be long enough to completely pull, via threading, the second section 22 toward the first section 20 and wedge the member 12 within the sleeve 70. In other words, the length of the bolt 46 is intentionally chosen, with respect to the length of the threaded end 48, such that, if the threaded end 48 is fully threaded into the nut 44, a portion 98 of the non threaded portion 52 will still extend outside the attachment portion 18, as best shown in FIG. 8. This means that the assembly of the second section 22 and of the bolt 46 will be free to slide within the member 12 and will therefore prevent the wedging of the member 12 within the sleeve 70. Thus, the bolt 46 is threaded on one end so as to thread into the nut 44 and has a head 50 on its other end that protrudes from the attachment portion 18 so as to be controllable from outside the member 10 and sleeve 70, the head 50 providing a means for rotation of the bolt. The hitch may further comprise a lock washer (not shown) on the bolt 46 between the head 50 and the aperture in the attachment portion 18, the lock washer also being too large to pass through the aperture.

Understandably, the length of the bolt 46 must not be too long as to extend too far outside of the hitch 10 and interfere with the trailer ball or the vehicle-mounted accessory secured to the attachment portion 18. Still, the bolt 46 must be long enough, with respect to the length of the threaded end 48, to prevent the wedging of the member 12 unless the locking device 90 is installed.

In use, the first section 20 and the second section 22 are typically coupled together via the bracket 36 and are further connected together via the bolt 46 which extends through the first section and that is threaded into the nut 44 of the second section 22. Hence, in use, the hitch 10 is typically wielded as a single or unitary structure.

Figure 7A:
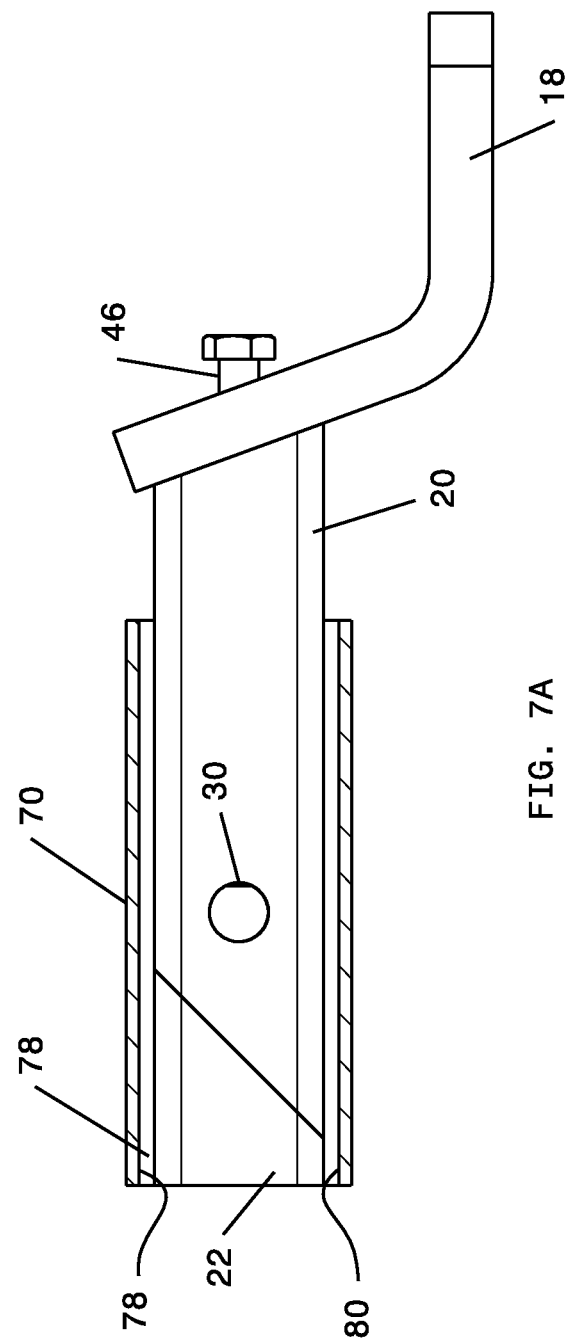
FIGS. 7A to 7C are sequential side views of the hitch of FIG. 1 during installation.
Figure 7B:
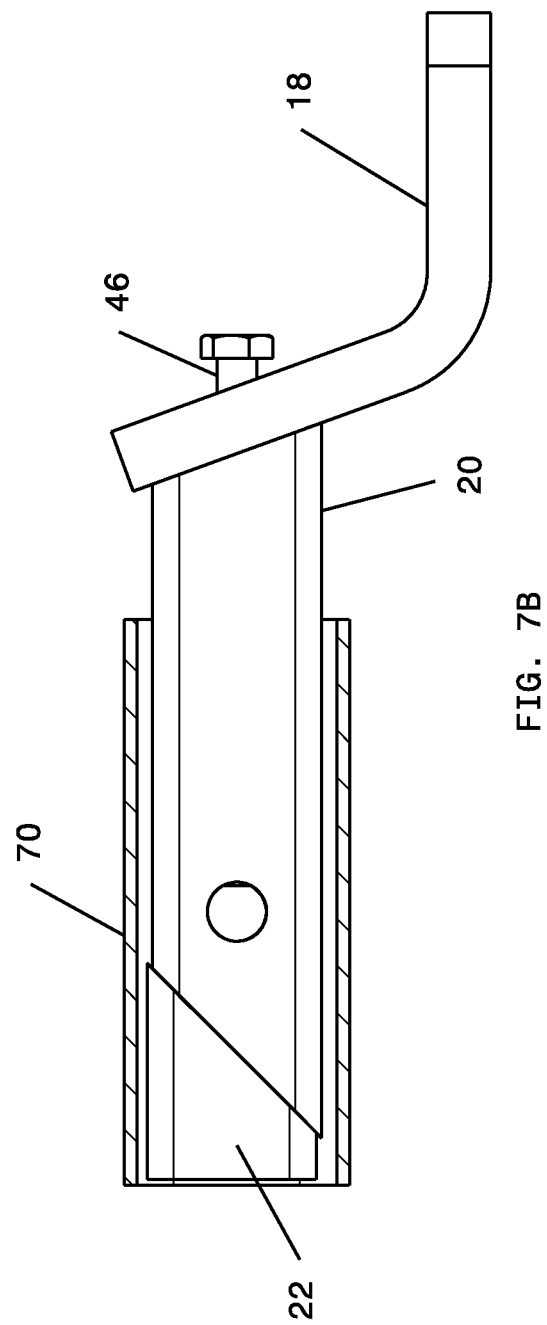
Figure 7C:
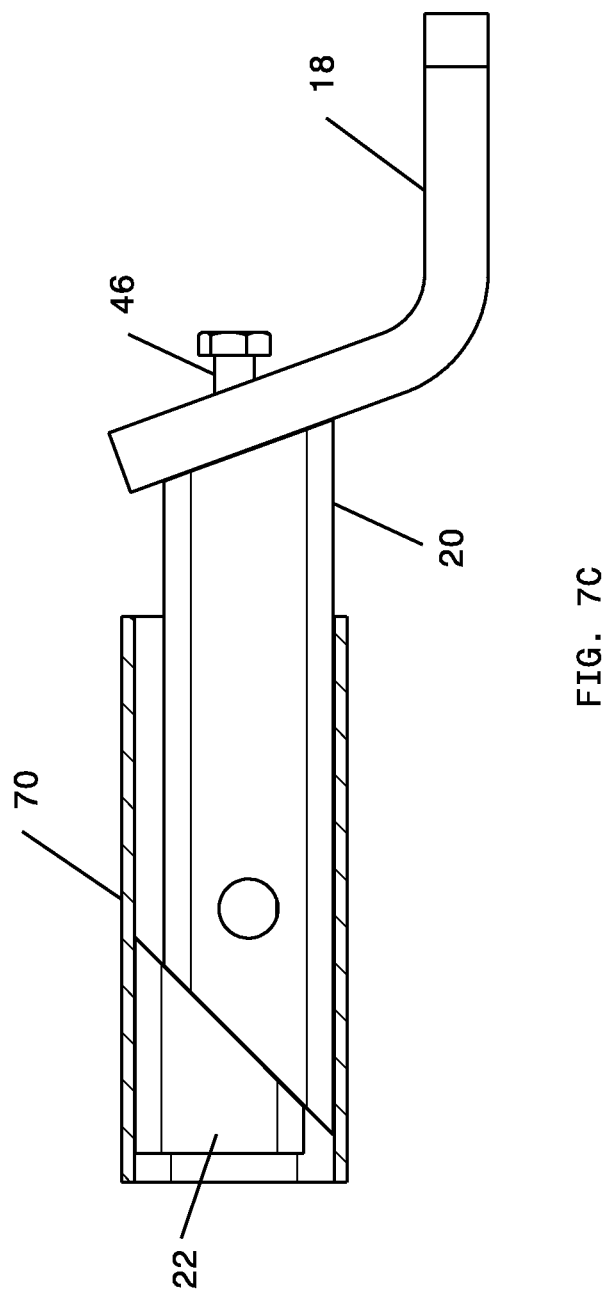

Referring now to FIGS. 7A to 7C, to install the hitch 10 into the sleeve 70, the member 12 is inserted into the sleeve 70 until the mounting holes 30 of the first section 20 are substantially aligned with the mounting holes 72 of the sleeve 70. Then, the locking device 90 is inserted through the mounting holes 72 of the sleeve 70, the mounting holes 30 of the first section 20 and through the side opening 38 of the bracket 36. The locking device 90 can then be further locked in a known manner via a conventional cotter pin or a padlock (not shown).

To further secure the hitch 10 to the sleeve 70, and eliminating play therebetween, the bolt 46 is typically first pushed until the bracket 36 or the threaded end 48 abuts on the locking device 90.

At this point, it is generally normal that a portion of the bolt 46 extends outside the attachment portion 18 and that the head 50 does not abut on the attachment portion 18.

Once the bracket 36, or the threaded end 48, abuts on the locking device 90, as best shown in FIG. 8, the bolt 46 is screwed, via its head 50 extending outside the hitch 10. The threading of the bolt 46 effectively pulls the second section 22 toward the first section 20. Then, due to the inclined plane 24 between the first section 20 and the second section 22, the pulling motion forces the second section 22 to slide in a first direction (upwardly in the present embodiment) and forces the first section 20 to slide in a second opposite direction (downwardly in the present embodiment).

The bolt 46 is threaded until the first section 20 and the second section 22 abut and press on opposite inner walls 78 and 80 of the sleeve 70. At this point, the hitch 10 should be firmly held in place without play between it and the sleeve 70.

As explained before, since only a predetermined portion of the bolt 46 is threaded, if a user tries to mount the system without the locking device 90, it will not be possible to mount the first section 20 and second section 22 into the sleeve in a press fitted arrangement. Indeed, if the locking device 90 is not mounted in the system (inserted through the mounting holes of the first section and of the sleeve), the threaded portion 48 of the bolt 46 will pass completely through the nut 44 without the head 50 of the bolt 46 contacting the attaching portion 18. Thus, the first section 20 and second section 22 are still free to move relatively to each other and relatively to the inner walls 78 and 80.

Now, when the locking device 90 is in place, the threaded portion 48 of the bolt 46 abuts against the locking device 90, as best illustrated in FIG. 8. In this configuration, when the bolt 46 is screwed, it engages the nut 44 and then it pull the second section 22 towards the first section 20. When the inclined plane of the second section 22 contacts the inclined plane of the first section 20, the second section 22 slide on the first section 20 along their inclined plane until the first section 20 and the second section 22 press against the inner walls 78 and 80 of the sleeve.

It is to be noted that the bracket is not limited to the shape shown in the drawing. Furthermore, the assembly of the nut in combination with the bracket could be replaced by a bracket having a threaded opening configured to receive the bolt, for example.

In variant of the present embodiment, the inclined surfaces of first and second sections are coated with a friction reducing material. The friction reducing material may be grease, polytetrafluoroethylene, ultra-high molecular weight ("UHMW") polyethylene, or low coefficient of friction film.

It will be understood that the present embodiment of the invention allows the hitch 10 to be installed in such a way as to prevent rattling and/or wobbling, and to be installed in a safe manner which absolutely requires the presence of the locking device 90.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A hitch for use in cooperation with a vehicle mounted sleeve, said sleeve comprising a longitudinal opening and a pair of aligned mounting holes configured to receive a locking device, said hitch comprising:
   a) a member adapted to be slidingly received into said sleeve, said member comprising:
      i) a first section comprising a first extremity and a second extremity, said second extremity of said first section defining a first plane inclined relatively to a longitudinal axis of said member, said first section comprising aligned mounting holes adapted to be alignment with said mounting holes of said sleeve and configured to receive said locking device when said member is received into said sleeve;
      ii) a second section comprising a first extremity and a second extremity, said first extremity of said second section defining a second plane inclined relatively to said longitudinal axis of said member, said first extremity of said second section being configured for sliding engagement with said second extremity of said first section along said first and second inclined planes, said second section comprising a bracket extending outwardly therefrom and configured to be received into said first section, said bracket comprising a threaded portion;
   b) a bolt extending in said first section, said bolt comprising a threaded end, said threaded end being configured to engage said threaded portion of said bracket;
   wherein said bolt is configured to cause said first and second sections to slide is opposite directions along said first and second inclined planes only when said locking device is received into said mounting holes of said sleeve and said mounting holes of said first section, and when said threaded end abuts on said locking device.

2. The hitch of claim 1, wherein said threaded portion is a fastener mounted to said bracket.

3. The hitch of claim 2, wherein said fastener is a nut.

4. The hitch of claim 1, wherein said second extremity of said first section and said first extremity of said second section are coated with a friction reducing material.

5. The hitch of claim 4, wherein said friction reducing material is grease, polytetrafluoroethylene, ultra-high molecular weight ("UHMW") polyethylene, or low coefficient of friction film.

6. The hitch of claim 1, wherein said locking device is a locking pin.

7. The hitch of claim 1, wherein said first extremity of said first section comprises an attachment portion.

8. The hitch of claim 1, wherein said bolt extends outside of said first section when said threaded end abuts on said locking device.

9. A method to install a hitch as claimed in claim 1 into a vehicle-mounted sleeve comprising aligned mounting holes, said method comprising:
   a) inserting said member into said sleeve until said mounting holes of said first section are in alignment with said mounting holes of said sleeve;
   b) inserting a locking device into said mounting holes of said sleeve and of said first section;
   c) screwing said bolt into said threaded portion until said threaded end abuts on said locking device;
   d) screwing said bolt to cause said first and second sections to slide in opposite directions along said first and second inclined planes until said first and second sections frictionally engage said sleeve.

10. The method of claim 9, wherein said locking device is a locking pin.

11. A hitch for use in cooperation with a vehicle mounted sleeve and a locking device, said sleeve comprising a longitudinal opening and a pair of aligned mounting holes configured to receive said locking device, said hitch comprising:
   a) a longitudinally extending member comprising:
      i) a first section comprising aligned mounting holes adapted to be in alignment with said mounting holes of sleeve and configured to receive said locking device when said member is received into said sleeve, and
      ii) a second section comprising a bracket extending outwardly therefrom and configured to be received onto said first section, said bracket comprising a threaded portion,
   wherein said first section and said second section comprise opposing extremities which are configured for sliding engagement along a plane inclined relative to a longitudinal direction of said member;
   b) a bolt extending in said member and comprising a thread end operatively connectable to said threaded portion,
   wherein said bolt is operable to cause said first and second sections to slide in opposite directions along said inclined plane to make frictional retentive engagement with said sleeve only when said locking device is received in said mounting holes of said sleeve and of said first section and when said threaded end of said bolt abuts against said locking device.

12. The hitch of claim 11, wherein said threaded portion is a threaded fastener.

13. The hitch of claim 11, wherein said opposing extremities of said first and second sections are coated with a friction reducing material.

14. The hitch of claim 13, wherein said friction reducing material is grease, polytetrafluoroethylene, ultra-high molecular weight ("UHMW") polyethylene, or low coefficient of friction film.

15. The hitch of claim 11, wherein said locking device is a locking pin.

16. The hitch of claim 11, wherein said first section comprises an attachment portion.

17. The hitch of claim 11, wherein said bolt extends outside of said first section when said threaded end abuts on said locking device.

18. A method to install a hitch as claimed in claim 11 into a vehicle-mounted sleeve comprising aligned mounting holes, said method comprising:
   a) inserting said member into said sleeve until said mounting holes of said first section are in alignment with said mounting holes of said sleeve;
   b) inserting a locking device into said mounting holes of said sleeve and of said first section;
   c) screwing said bolt into said threaded portion until said threaded end abuts on said locking device;
   d) screwing said bolt to cause said first and second sections to slide in opposite directions along said inclined plane until said first and second sections frictionally engage said sleeve.

19. The method of claim 18, wherein said locking device is a locking pin.

\* \* \* \* \*